United States Patent [19]

Zemel et al.

[11] Patent Number: 5,477,734
[45] Date of Patent: Dec. 26, 1995

[54] PYROELECTRIC SWIRL MEASUREMENT

[75] Inventors: Jay N. Zemel, Jenkintown; Hsin-Yi Hsieh, Drexel Hill, both of Pa.; Anita L. Spetz, Linköping, Sweden

[73] Assignee: Gas Research Institute, Chicago, Ill.

[21] Appl. No.: 290,023

[22] Filed: Aug. 12, 1994

[51] Int. Cl.⁶ .................................................. G01F 1/68
[52] U.S. Cl. ................................ 73/204.23; 73/204.11
[58] Field of Search ................................. 73/204.23, 204

[56] References Cited

U.S. PATENT DOCUMENTS

| | | |
|---|---|---|
| 3,425,277 | 2/1969 | Adams . |
| 3,519,924 | 7/1970 | Burton . |
| 4,332,157 | 6/1982 | Zemel et al. . |
| 4,449,401 | 5/1984 | Kaiser et al. . |
| 4,453,405 | 6/1984 | Zemel . |
| 4,463,601 | 8/1984 | Rask . |
| 4,608,865 | 9/1986 | Muller et al. . |
| 4,850,714 | 7/1989 | Wiegleb . |
| 4,916,948 | 4/1990 | Inada et al. . |

Primary Examiner—Richard Chilcot
Assistant Examiner—Jewel V. Artis
Attorney, Agent, or Firm—Speckman, Pauley & Fejer

[57] ABSTRACT

A pyroelectric swirl indicator for measurement of swirl in flowing fluid comprising at least one pyroelectric substrate having at least one surface to which is applied a fluctuating heat input, the fluctuating heat input causing a fluctuating surface charge distribution in response to temperature fluctuations of the substrate. Spaced apart conductor elements for sensing the fluctuating surface charge on the surface of the substrate in the vicinity of the spaced apart conductor elements are provided, the differences in the charge fluctuations between the spaced apart conductor elements comprising an indication of swirl flow in the fluid, said spaced apart conductor elements disposed in a manner which enables measurement of orthogonal components of fluid flow.

11 Claims, 2 Drawing Sheets

PYROELECTRIC SWIRL MEASUREMENT

BACKGROUND OF THE INVENTION

1. Field of the Invention

This invention relates to a method and apparatus for measurement of swirl in a flowing fluid using pyroelectric anemometers. The method and apparatus of this invention are based upon the electrical response characteristics of pyroelectric anemometers to fluid flow.

2. Description of Prior Art

Thermal flow meters utilize the convective heat transfer between a moving fluid stream and a heated solid to measure flow rate. Thermal energy is transferred from the heated solid to the flowing fluid resulting in a decrease in the temperature of the heated solid, which decrease can be used as an indicator of flow rate. A thermal flow meter has two basic components: a heater and a transducer. The heater is used to elevate the solid temperature and the transducer detects the flow-induced change of the thermal process. The transducer converts the change of temperature or heat loss into an electronic signal that can be processed by electronic instruments. Thermal flow sensors are utilized in, for example, meteorology to determine wind velocity and direction, indoor climate control, biomedical measurements, such as respiration and blood flow, transport and process industries, and fluid dynamics research, such as wind-tunnel experimentation.

A pyroelectric anemometer is a device for measuring fluid flow comprising suitably oriented pyroelectric materials on which are deposited measuring electrodes symmetrically disposed about a deposited heater element. The pyroelectric materials have a high thermal sensitivity. The heater element is driven by an alternating current which generates an alternating thermal current at twice the current frequency. This alternating thermal current, in turn, generates an alternating voltage output at the thermal excitation frequency which depends on the velocity of the fluid flow. Upstream and downstream electrodes disposed on a pyroelectric material substrate measure the alternating charge redistribution of the pyroelectric substrate material due to the alternating heat flowing from the centrally located heating element on the substrate. When a fluid flow is present over the pyroelectric material substrate, the upstream electrode is cooled to a greater extent than the downstream electrode and, thus, its temperature is lower and, thus, the charge redistribution associated with the upstream electrode is less than the charge redistribution associated with the downstream electrode. The electrodes are connected to a differential amplifier whose output is connected to a further amplifier and an electronic meter. Means for heating the pyroelectric material substrate in a fluctuating manner to permit the necessary charge redistribution are also provided. As the temperature of the heater varies, the output of the two electrodes varies and, in addition, the amplitude and phase (relative to the input thermal signal) of their outputs is affected, depending upon whether they are upstream or downstream of the heating element when the fluid flows. The extent of the difference in the signal from the two electrodes is indicative of the flow velocity. A linear pyroelectric anemometer suitable for measurement of flow velocity is taught, for example, by U.S. Pat. No. 4,332,157.

The vorticity field is the primary dynamic variable of interest in many hydrodynamic situations, particularly in turbulent flow. Small scale vortices near walls are believed to be responsible for the generation of turbulence in boundary layers. Numerical simulations of the structure and evolution of turbulent flow fields are often made in terms of the vorticity field. U.S. Pat. No. 4,453,405 teaches a pyroelectric vorticimeter which is used to measure shear flow components in both the X and Y directions where the two shear flow components are electrically multiplied to provide an electronic indication of the vorticity of flow in a region of the pyroelectric substrate. A fluctuating heat input is applied to the pyroelectric substrate and two spaced conductor elements are used to sense a difference in surface charge fluctuations between the two conductor elements.

The geometry in the measurement of swirl using a pyroelectric anemometer is important to obtaining useful results. What is needed is information about the fluid flow in two orthogonal directions. The primary difference between vorticity measurement and swirl measurement is that in vorticity measurement, local motion of the fluid due, for example, to large scale mass motion or a local variation in turbulence is important whereas in swirl measurement, interest is in determining the spin of a fluid as it moves down, for example, a pipe. As a result, a pyroelectric vorticimeter such as that taught by the '405 patent is not suitable for measuring swirl in a flowing fluid.

Pyroelectric anemometers have been shown to have extraordinarily high precision over a broad range of flows, particularly when compared to calorimetric type thermal flow meters such as capillary flow meters, and boundary-layer type thermal flow meters, such as hot wire/film anemometers and silicon flow meters.

U.S. Pat. No. 4,850,714 teaches an apparatus for measuring thermal conductivity of a gas using two temperature-dependent measuring resistors disposed along a bypass-type gas flow path. More particularly, the '714 patent teaches locating a second heatable and temperature-dependent measuring resistor in close proximity to a first measuring resistor, one behind the other along the gas flow path, and locating these two measuring resistors electrically in opposite arms of a measuring bridge.

An electrical thermal flow meter comprising a pair of thermistors in opposite arms of a Wheatstone bridge and an electric heater positioned in heat transfer relation with respect to the first thermistor and isolated from the second thermistor is taught by U.S. Pat. No. 3,425,277. Flowmeters are also taught by U.S. Pat. No. 4,449,401 which teaches a flow meter having a Venturi tube position within a passage that receives a portion of the airflow in the throat of which is disposed a constant temperature thermal anemometer which generates an output signal as a function of the total mass airflow through the flow meter; U.S. Pat. No. 4,916,948 which teaches thermal sensitive resistors positioned within a housing, externally and internally with respect to a pipe passage disposed within a central portion of the housing so that an accurate flow rate can be measured even when the fluid flow rate varies within a single plane; and U.S. Pat. No. 4,463,601 which teaches an airflow sensor for determining mass flow rate in a branch of a system having two flow branches which meet at a junction.

U.S. Pat. No. 4,608,865 teaches an integrated circuit pyroelectric sensor which uses two pyroelectric compositors for measuring a differential voltage across gates. The voltage and charge stored across each pyroelectric compositor is a function of temperature.

Finally, U.S. Pat. No. 3,519,924 teaches a heat-sensitive frequency-selective apparatus for measuring variable conditions of flowing fluid, such as temperature characteristics. The crystal unit is used to sense fluid velocity as a function of temperature difference sensed by the crystal unit, given a constant direction of flow and a constant density of the fluid.

None of the prior art of which we are aware teaches the use of a pyroelectric anemometer for measurement of swirl in a flowing fluid.

SUMMARY OF THE INVENTION

It is an object of this invention to provide an apparatus for measurement of swirl in a flowing fluid.

It is another object of this invention to provide a method for measurement of swirl in a flowing fluid.

These and other objects of this invention are achieved by a pyroelectric swirl indicator for measurement of swirl in a flowing fluid comprising at least one pyroelectric substrate having at least one surface, means for applying a fluctuating heat input to the substrate, which input causes a fluctuating surface charge distribution in response to temperature fluctuations of the substrate, and spaced apart conductor element means for sensing a fluctuating surface charge on the surface of the substrate in the vicinity of the spaced apart conductor element means, the differences in the charge fluctuations between the spaced apart conductor element means comprising an indication of swirl flow in the fluid. The spaced apart conductor element means are disposed relative to said surface of said pyroelectric substrate in a manner which enables measurement of orthogonal components of fluid flow.

In accordance with one embodiment of this invention, the pyroelectric swirl indicator comprises a fluctuating heat input in the form of a fluctuating power supply and two heater elements disposed on the substrate and connected to the fluctuating power supply. The first heater element of the two heater elements is disposed on the substrate perpendicular to the direction of the fluid flow and the second heater element is disposed on the substrate perpendicular to the first heater element. As a result, when the pyroelectric swirl indicator of this invention is positioned for measurement of swirl in a fluid stream, the first heater element is disposed perpendicular to the direction of flow of the fluid and the second heater element is disposed parallel to the direction of flow of said fluid. In accordance with this embodiment, the spaced apart conductor element means comprises at least three conductor elements disposed on the same side of the substrate as the two heater elements, each of the two heater elements being disposed between two of the three conductor elements. A common conductor is disposed on the opposite side of the substrate whereby the substrate is sandwiched between the common conductor and the three conductor elements.

In accordance with a second embodiment of the pyroelectric swirl indicator of this invention, two pyroelectric substrates are disposed in a side-by-side relationship perpendicular to the direction of flow of the fluid being measured. Disposed on the corresponding side of each substrate is means for applying a fluctuating heat input to each substrate and spaced apart conductor elements.

A method of determining swirl in a flowing fluid in accordance with one embodiment of this invention comprises introducing a pyroelectric substrate having at least one surface parallel to the direction of flow of fluid into the flowing fluid, applying a fluctuating heat input to the substrate causing a fluctuating surface charge distribution in response to temperature fluctuations of the pyroelectric substrate, and sensing a fluctuating surface charge on the surface of the substrate at least three different locations, two of the locations spaced apart at least in a direction other than perpendicular with respect to the direction of flow of the fluid, the differences at said at least three locations comprising an indication of orthogonal flow in the fluid flow.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Pyroelectricity is the electricity generated by temperature change on certain crystals due to spontaneous polarization of the crystals which creates surface charges on certain surfaces thereof. The surface charges are eventually neutralized by free electric charges acquired from surrounding media and from the conduction current in the pyroelectric crystal. If the temperature of the pyroelectric crystal changes, for example by heating, surface charges which can be detected by conventional electronic instruments are induced by the change of spontaneous polarization.

Figure 1:
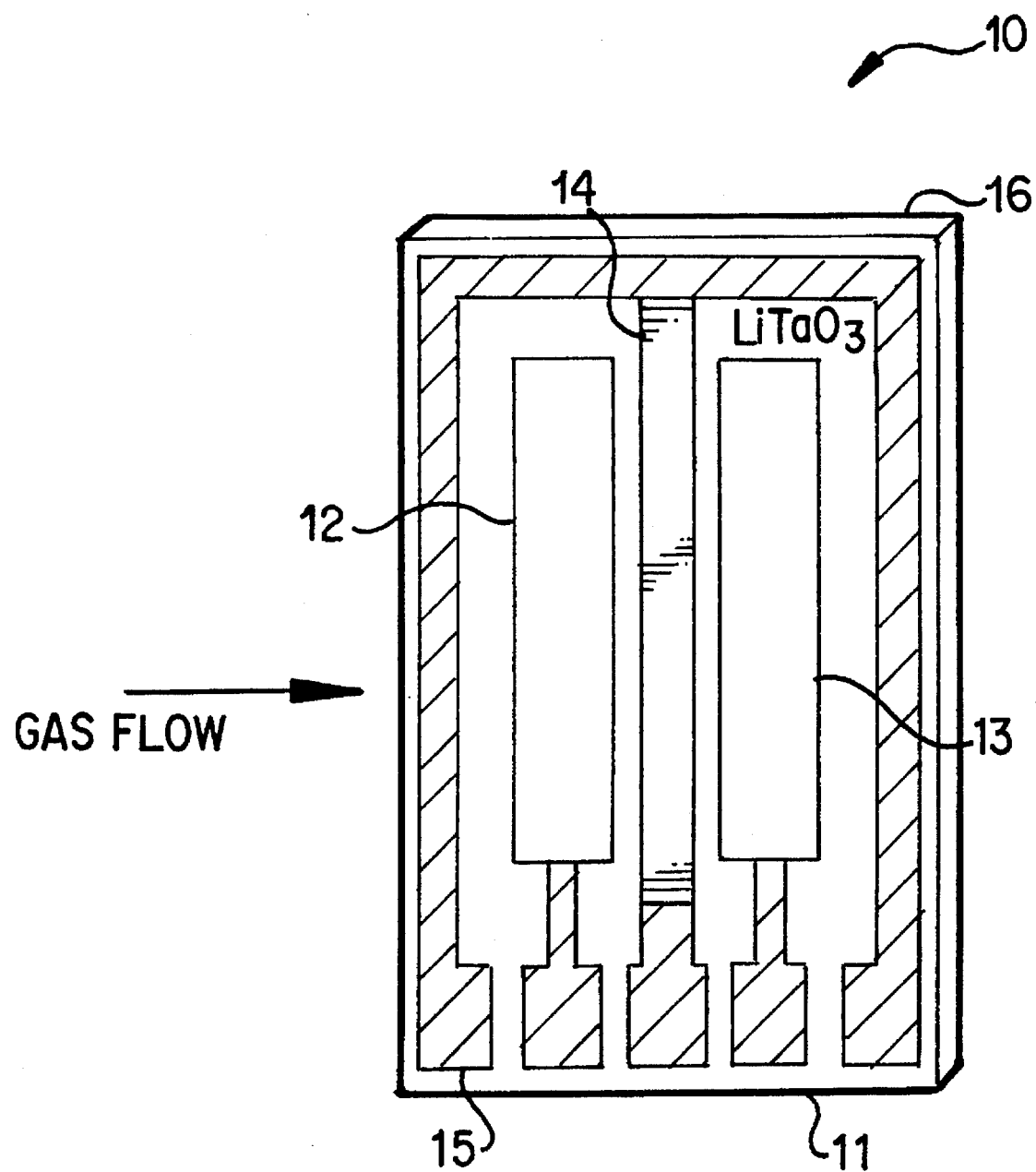
FIG. 1 is a schematic diagram of a linear pyroelectric anemometer used for measuring mass flow of a fluid.

A pyroelectric anemometer is a thermal mass flow meter that uses pyroelectric material, that is crystals, as the temperature transducer. FIG. 1 shows a typical linear pyroelectric anemometer 10 suitable for use in the system and method of this invention. Pyroelectric anemometer 10 comprises a pyroelectric material substrate 11, preferably a small z-cut LiTaO$_3$ chip. LiTaO$_3$ is preferred for its high pyroelectric co-efficient (1.9×10$^{-8}$ coulomb/cm$^{2\circ}$ K.) and high Curie temperature (609° C.). The front surface of the substrate 11 has a thin center heater NiCr film strip 14 positioned at its center and two electrode NiCr film strips 12, 13 deposited symmetrically beside center heater NiCr film strip 14. The back of substrate 11 has a thin film 16 of NiCr deposited on it as the ground. Each of electrode NiCr film strips 12, 13 and center heater NiCr film strip 14 are electrically connected to substrate 11 by conducting pad 15 formed of a conductive metal, for example, gold.

Accordingly, electrode NiCr film strips 12, 13 with pyroelectric material substrate 11 sandwiched between them and the ground are, in fact, capacitors. The charges collected on the electrodes depend on the change of the temperature and applied field.

The operating principles of pyroelectric anemometer 10 are as follows. Center heater NiCr film strip 14 is driven by an ac current I with a frequency f at a few Hz as follows:

$$I = I_o \cos(2\pi f t)$$

where $I_o$ is the amplitude of the electric current and t is the time. Sinusoidal heating is required because any charges created by constant heating would be neutralized by the leakage current. The power $P_h$ generated by the electric current I is:

$$P_h = I^2 R_h = \tfrac{1}{2} I_o^2 R_h [1 + \cos(4\pi f t)]$$

where $R_h$ is the resistance of the NiCr strips. The power generated has two components: a dc component with magnitude $\frac{1}{2}I_o^2R_h$, and an ac component having the amplitude $\frac{1}{2}I_o^2R_h$. The frequency of the ac power is double the frequency of the electric current. The dc power induces a constant surface charge that is neutralized by the leakage current. The ac power creates an oscillating temperature field that propagates into the pyroelectric anemometer with an angular frequency $\omega=4\pi f$. The oscillating temperature under the electrode induces oscillating charges and a corresponding oscillating current on the electrode due to the pyroelectric effect. The difference between the pyroelectric current induced on the two electrodes, $\Delta i$, is used to measure the flow rate according to the following equation:

$$\Delta i = \bar{p} A_e \frac{d}{dt} [<\theta>_D - <\theta>_U]$$

where $\bar{p}$ is the pyroelectric co-efficient, $A_e$ is the electrode area, $<\Theta>$ is the temperature of the pyroelectric crystal averaged under the electrode, and U and D denote the upstream and downstream electrodes, respectively. At zero fluid flow, both electrodes 12, 13 will have the same oscillating current due to symmetry and $\Delta i$ will equal zero. As fluid flows, the convective heat loss at the upstream electrode will be different from the downstream electrode, inducing a different pyroelectric current on the two electrodes such that $\Delta i$ is no longer equal to zero.

The standard means for measuring swirl in a flowing fluid is the laser Doppler anemometer. This device utilizes the Doppler shift of a laser beam scattered in a given volume of fluid to determine its instantaneous speed. While a versatile and accurate means, it is both expensive and demanding with respect to experimental conditions. Furthermore, the lower bounds on the speeds and the need for scattering particles limit its general applicability. By contrast the pyroelectric anemometer requires simple equipment, is inherently modest in cost and provides information that extends down to gas speeds as low as millimeters per second. It is local probe and, while it can be non-intrusive on the wall of a duct, it would be intrusive is used as a bayonet device in the body of the duct.

The pyroelectric anemometer is a highly directional device whose response varies as $\cos^{1/2}\phi$, where $\phi$ is the angle between the gas velocity vector and the normal to the heater element along the surface of the device. By positioning electrodes and heater elements orthogonally on a pyroelectric substrate, a structure is provided that measures two components of the fluid flow in the plane of the device.

Figure 2:
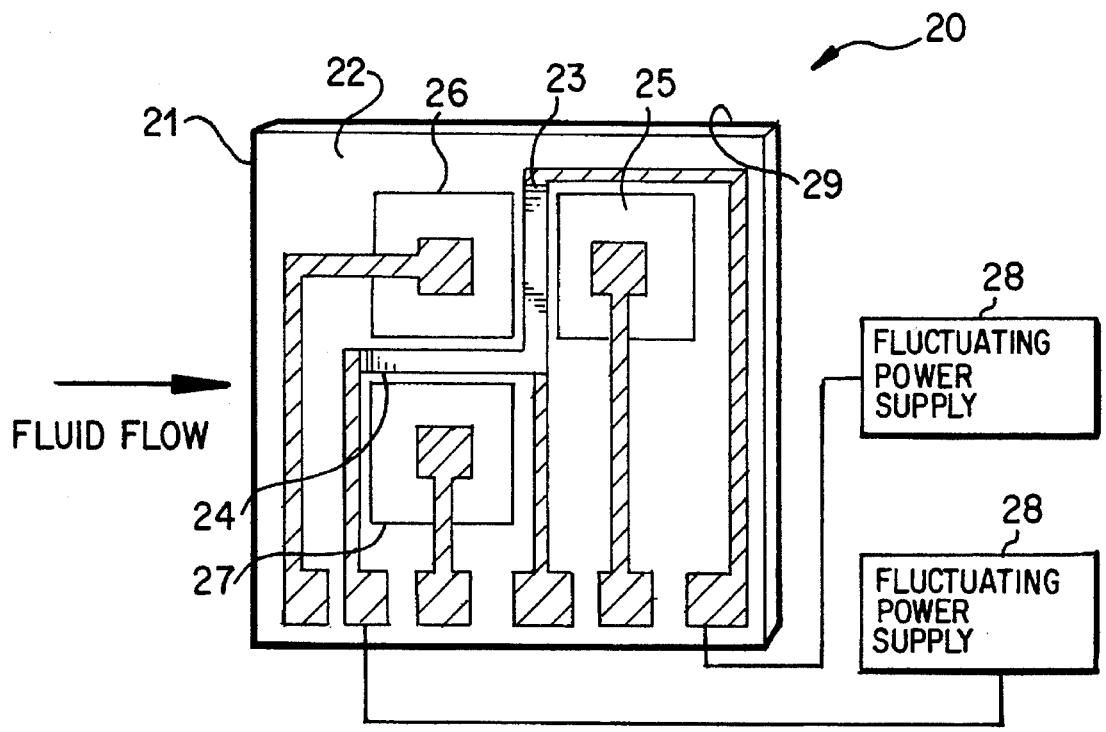
FIG. 2 is a schematic diagram of a pyroelectric swirl indicator in accordance with one embodiment of this invention.

FIG. 2 shows a pyroelectric swirl indicator for measurement of swirl in a flowing fluid in accordance with one embodiment of this invention. Pyroelectric swirl indicator 20 comprises at least one pyroelectric substrate 21 having at least one surface 22, means for applying a fluctuating heat input to pyroelectric substrate 21, thereby causing a fluctuating surface charge distribution in response to temperature fluctuations of pyroelectric substrate 21, and spaced apart conductor element means for sensing a fluctuating surface charge on surface 22 of pyroelectric substrate 21 in the vicinity of the spaced apart conductor element means, differences in the charge fluctuations between the spaced apart conductor element means comprising an indication of swirl flow in the fluid, said spaced apart conductor element means being disposed in a manner which enables measurement of orthogonal components of fluid flow.

In accordance with one embodiment of this invention as shown in FIG. 2, the fluctuating heat input is applied to pyroelectric substrate 21 by a fluctuating power supply 28 comprising means for providing a sine wave output connected to two elongated heater elements 23, 24 disposed on pyroelectric substrate 21. First elongated heater element 23 is disposed on pyroelectric substrate 21 with its longitudinal axis perpendicular to the primary direction of fluid flow. Second elongated heater element 24 is disposed on pyroelectric substrate 21 with its longitudinal axis perpendicular to the longitudinal axis of first elongated heater element 23.

As shown in FIG. 2, spaced apart conductor means comprises at least three conductor elements 25, 26, 27 disposed on the same side of pyroelectric substrate 21 as heater elements 23, 24. To obtain the orthogonal measurements required for swirl determination, each of heater elements 23, 24 is disposed between two of the three conductor elements 25, 26, 27. That is, heater element 23 is disposed between conductor elements 25 and 26 and heater element 24 is disposed between conductor elements 26 and 27. A common conductor 29 is disposed on the opposite side of pyroelectric substrate 21 whereby pyroelectric substrate 21 is sandwiched between common conductor 29 and conductor elements 25, 26, 27.

In operation, the differential signal required to obtain axial and tangential fluid flow for determining swirl is alternatingly obtained from one pair of conductor elements 25 and 26 disposed around heater element 23 and the other pair of conductor elements 26 and 27 disposed around heater element 24. That is, heater elements 23 and 24 are alternatingly switched on and off to obtain the desired signals. The axial and tangential components of the fluid flow define a swirl angle, $\phi_{sw}$, that is the difference between the angle of swirl flow velocity and straight flow velocity.

Figure 3:
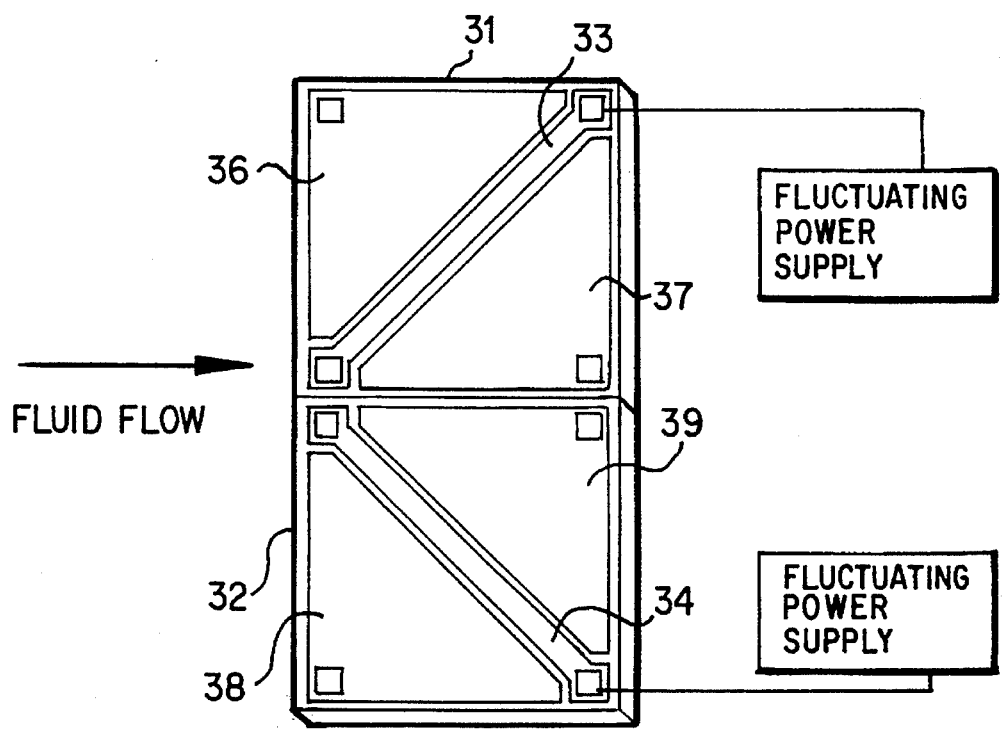
FIG. 3 is a schematic diagram of a pyroelectric swirl indicator in accordance with another embodiment of this invention.

One of the disadvantages of the embodiment of a pyroelectric swirl indicator as shown in FIG. 2 is that vector flow cannot be determined instantaneously due to the need to alternatingly switch heater elements 23 and 24 on and off. FIG. 3 shows a pyroelectric swirl indicator in accordance with another embodiment of this invention which overcomes this disadvantage. The pyroelectric swirl indicator in accordance with this embodiment comprises a first pyroelectric substrate 31 and a second pyroelectric substrate 32 disposed in a side-by-side relationship perpendicular to the direction of fluid flow. Means for applying a fluctuating heat input in the form of first elongated heater element 33 and second elongated heater element 34 are disposed on corresponding sides of first pyroelectric substrate 31 and second pyroelectric substrate 32, respectively. Spaced apart conductor element means are disposed on said corresponding sides of first pyroelectric substrate 31 and second pyroelectric substrate 32. The spaced apart conductor element means in accordance with this embodiment of this invention comprises two conductor elements 36 and 37 disposed on first pyroelectric substrate 31 with first elongated heater element 33 disposed between conductor elements 36 and 37 and two conductor elements 38 and 39 disposed on second pyroelectric substrate 32 with second elongated heater element 34 disposed between conductor elements 38 and 39. First elongated heater element 33 is positioned on first pyroelectric substrate 31 so as to form an acute angle with the direction of said fluid flow and second elongated heater element 34 is positioned on second pyroelectric substrate 32 so as to be perpendicular to first elongated heater element 33. The benefit of utilizing two separate pyroelectric substrates, each of which is independently heated by fluctuating heat input means, is that the two pyroelectric substrates with corresponding heater and conductor elements are thermally isolated from each other, thereby enabling both substrates to be heated simultaneously. The two orthogonal signals simultaneously obtained from the two substrates can then be electronically combined to determine the swirl angle.

The method for determining swirl in a flowing fluid in accordance with one embodiment of this invention comprises introducing a pyroelectric substrate having at least one surface parallel to the direction of flow of the fluid into the flowing fluid, applying a fluctuating heat input to said substrate, said fluctuating heat causing a fluctuating surface charge distribution in response to temperature fluctuations of said pyroelectric substrate, and sensing a fluctuating surface charge on said surface at least three different locations, two of the three locations spaced apart at least in a direction other than perpendicular with respect to the direction of flow of said fluid, the differences at the three different locations comprising an indication of orthogonal flow in the fluid flow.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A pyroelectric swirl indicator for measurement of swirl in flowing fluid comprising:

at least one pyroelectric substrate having at least one surface;

means for applying a fluctuating heat input to said at least one substrate, said input causing a fluctuating surface charge distribution in response to temperature fluctuations of said at least one substrate; and spaced apart conductor element means for sensing a fluctuating surface charge on said at least one surface in the vicinity of said spaced apart conductor element means, differences in said charge fluctuations between said spaced apart conductor element means comprising an indication of swirl flow in said fluid, said spaced apart conductor element means disposed to obtain the orthogonal measurements required for swirl determination which enables measurement of orthogonal components of fluid flow.

2. A pyroelectric swirl indicator in accordance with claim 1, wherein said means for applying a fluctuating heat input to said at least one substrate comprises a fluctuating power supply and two heater elements disposed on said at least one substrate and connected to said fluctuating power supply, the first heater element of said two heater elements disposed on said at least one substrate perpendicular to the direction of said fluid flow and the second heater element of said two heater elements disposed on said at least one substrate perpendicular to said first heater element.

3. A pyroelectric swirl indicator in accordance with claim 2, wherein said spaced apart conductor element means comprises at least three conductor elements disposed on the same side of said at least one substrate as said two heater elements, each of said two heater elements disposed between two of said three conductor elements, and a common conductor disposed on an opposite side of said at least one substrate whereby said at least one substrate is sandwiched between said common conductor and said at least three conductor elements.

4. A pyroelectric swirl indicator in accordance with claim 2, wherein said fluctuating power supply comprises means for providing a sine wave output to each of said two heater elements.

5. A pyroelectric swirl indicator in accordance with claim 1, wherein said at least one substrate is lithium tantalate ($LiTaO_3$).

6. A pyroelectric swirl indicator in accordance with claim 1 comprising a first said substrate and a second said substrate disposed in a side-by-side relationship perpendicular to the direction of said fluid flow, said means for applying a fluctuating heat input disposed on the corresponding sides of said first said substrate and said second said substrate, and said spaced apart conductor element means disposed on said corresponding sides of said first said substrate and said second said substrate.

7. A pyroelectric swirl indicator in accordance with claim 6, wherein said means for applying a fluctuating heat input comprises a fluctuating power supply and at least one heater element disposed on said corresponding sides of each of said first said substrate and said second said substrate and connected to said fluctuating power supply.

8. A pyroelectric swirl indicator in accordance with claim 7, wherein said spaced apart conductor element means comprises two conductor elements disposed on the same side as said heater elements of each of said first said substrate and said second said substrate, said heater element corresponding to each of said first said substrate and said second said substrate disposed between each of said two conductor elements corresponding to said first said substrate and said second said substrate.

9. A pyroelectric swirl indicator in accordance with claim 8, wherein said heater element corresponding to said first said substrate is positioned so as to form an acute angle with the direction of said fluid flow and said heater element corresponding to said second said substrate is positioned so as to be perpendicular to said heater element corresponding to said first said substrate.

10. A pyroelectric swirl indicator in accordance with claim 9, wherein said spaced apart conductor element means further comprises a common conductor disposed on an opposite side of each of said first said substrate and said second said substrate whereby said substrates are sandwiched between each said common conductor and said two conductor elements corresponding to each of said substrates.

11. A method of determining swirl in a flowing fluid comprising:

introducing a pyroelectric substrate having at least one surface parallel to the direction of flow of said fluid into the fluid stream;

applying a fluctuating heat input to said substrate, said fluctuating heat causing a fluctuating surface charge distribution in response to temperature fluctuations of said pyroelectric substrate; and sensing a fluctuating surface charge on said at least one surface at at least three different locations, two of said three locations spaced apart at least in a direction other than perpendicular with respect to said direction of flow of said fluid, said differences at said at least three different locations comprising an indication of orthogonal flow in said fluid flow.

\* \* \* \* \*